K. J. E. HESSELMAN.
INTERNAL COMBUSTION ENGINE.
APPLICATION FILED MAR. 6, 1915.
1,162,775.
Patented Dec. 7, 1915.
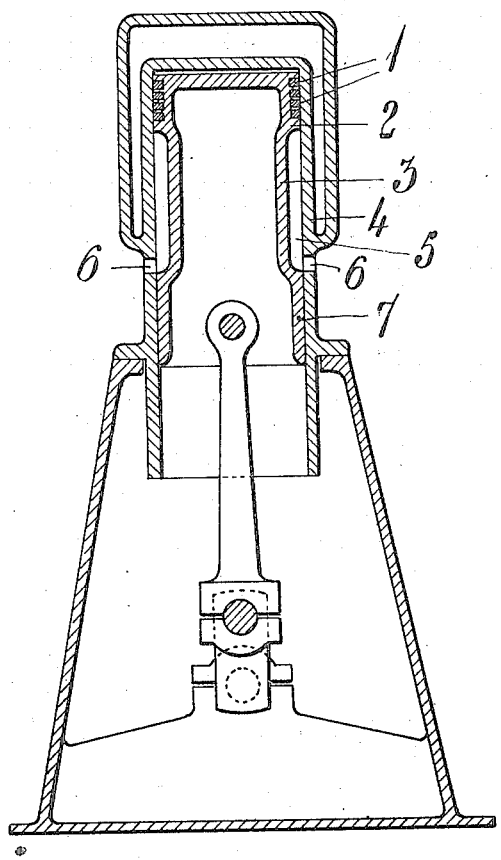
Witnesses
E. J. Sheehy.
F. S. Sheehy
Inventor
K. J. E. Hesselman
by James Sheehy & Co.
attys

UNITED STATES PATENT OFFICE.

KNUT JONAS ELIAS HESSELMAN, OF STOCKHOLM, SWEDEN.

INTERNAL-COMBUSTION ENGINE.

1,162,775.  Specification of Letters Patent.  Patented Dec. 7, 1915.

Application filed March 6, 1915. Serial No. 12,564.

*To all whom it may concern:*

Be it known that I, KNUT JONAS ELIAS HESSELMAN, a citizen of the Kingdom of Sweden, residing at Saltsjö-Storängen, Stockholm, Sweden, have invented new and useful Improvements in Internal-Combustion Engines, of which the following is a specification.

The present invention relates to internal combustion engines and more especially to engines of this kind provided with plunger pistons.

In internal combustion engines, in which plunger pistons are used, as for instance in the air pumps, scavenging pumps, working cylinders, etc., it easily happens that lubricating oil in a rather considerable degree, owing to the action of suction or for other reasons, passes by the piston into the pressure chamber of the pumps, the compression chamber of the working cylinders and so on. In the air pumps said lubricating oil is passed together with the air to the compressed air receiver and may in such case cause various inconveniences, as for instance explosions. In the working cylinders the inconvenience arises that oil transferred to the compression chamber is coked.

The object of the invention is to provide a device by means of which the said disadvantages are obviated.

The invention consists in this that a portion of the piston which in well-known manner has a smaller outer diameter than the portion of the piston provided with the packing rings and the portion thereof serving as a crosshead, is of a length substantially corresponding to the length of the stroke of the piston while at the same time the space between the said portion of the piston of the smaller diameter and the wall of the cylinder is in open communication with the atmosphere.

In the accompanying drawing I have shown diagrammatically a sectional view of the cylinder, the crank casing and the plunger piston of an internal combustion engine to which the invention is applied.

As is shown in the drawing, the plunger piston below the portion 2 provided with the packing rings 1, has in well-known manner a narrower portion 3. The space formed between said narrower portion 3 and the inner side of the cylinder 4 communicates through one or more apertures 6 with the atmosphere. Below the narrower portion 3 the piston is formed with a portion 7 in contact with the wall of the cylinder and serving as a crosshead. Since the said space is connected with the outer air, the piston, when moving, cannot produce any suction effect on the oil, which is supplied as usual in abundance to the portions of the cylinder walls passed by the portion 7 of the piston.

The narrower portion 3 of the piston extends in axial direction substantially in correspondence to the length of the stroke, and, owing thereto, the portion of the piston provided with the packing rings will not at all or at least to a very small extent come into contact with the surfaces passed by the portion 7 of the piston and oiled abundantly. Even this circumstance will aid to prevent the lubricating oil from being transferred to the pressure chamber of the cylinder. The oil passing by the portion 7 of the piston during the movements of the latter will flow out through the apertures 6.

Having thus described my invention what I claim as new and desire to secure by Letters Patent is:—

An internal combustion engine, including a cylinder having a side wall and a port therein open to the atmosphere, a piston movable in the cylinder and having a packed portion and a portion constructed and arranged to serve as a cross-head, and also having intermediate said portions a portion smaller in diameter than the same; the said smaller portion extending in axial direction corresponding in length to the stroke of the piston and affording a space always in communication with said port.

In testimony whereof I have set my hand hereunto in presence of two subscribing witnesses.

KNUT JONAS ELIAS HESSELMAN.

Witnesses:
 CONRAD DITMAR,
 HILDUR HAKANSON.

Copies of this patent may be obtained for five cents each, by addressing the "Commissioner of Patents, Washington, D. C."